United States Patent Office 3,736,318
Patented May 29, 1973

---

3,736,318
6-(2-SUBSTITUTED-3-PHENYL-2H-ISOINDOLE-1-CARBOXAMIDO)PENICILLANIC ACIDS
Ronald J. McCaully, Malvern, and Stanley C. Bell, Penn Valley, Pa., assignors to American Home Products Corporation, New York, N.Y.
No Drawing. Filed Sept. 9, 1971, Ser. No. 179,174
Int. Cl. C07d 99/16
U.S. Cl. 260—239.1
2 Claims

ABSTRACT OF THE DISCLOSURE

Novel 6-(2-substituted-3-phenyl-2H-isoindole-1-carboxamido)penicillanic acids are described which are useful as antibacterial agents.

---

This invention relates to novel penicillins represented by the formula:

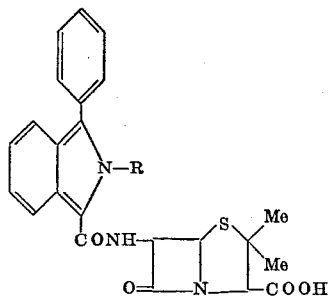

wherein R is selected from the class consisting of lower alkyl and aryl(lower)alkyl.

The term "lower alkyl" as employed herein includes both straight and branch chain radicals of $C_1$ through $C_7$ carbons as exemplified by methyl, ethyl, propyl, isopropyl, n-butyl, 1,1-dimethyl butyl, n-hexyl, etc. The term "ara(lower) alkyl" means monocyclic and bicyclic carbocyclic lower alkyl radicals exemplified by benzyl, β-phenylethyl, α-phenylpropyl, α-phenylethyl, α-naphthylethyl.

The novel products of this invention form salts which are also part of the invention. Non-toxic pharmaceutically acceptable salts of the acidic carboxylic acid group of the penicillin compounds include potassium, calcium, sodium, ammonium, procaine, dibenzylamine, N,N'-dibenzylethylenediamine, N-ethylpiperidine, etc.

The novel penicillins of this invention are prepared according to the following reaction:

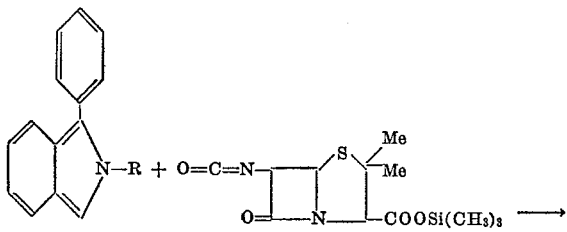

Formula I wherein R has the same meaning as in Formula I. The compound of Formula III may be prepared by the procedure described in Example 1. The compounds of Formula II may be prepared in accordance with the procedure described by W. Theilacker et al. Ann., 584, 87 (1953), and D. F. Veber et al., J. Am. Chem. Soc., 86, 4152 (1964).

The novel compounds of the present invention are useful as therapeutic agents in poultry and mammals in the treatment of infectious diseases caused by gram-positive and gram-negative bacteria upon parenteral or oral administration. They are also useful in in vitro applications, such as for disinfecting compositions.

The following examples serve to illustrate the invention.

EXAMPLE 1

6-isocyanatopenicillanic acid, trimethylsilyl ester

In a 5 liter three-necked flask equipped with stirrer, dropping-funnel, $P_2O_5$-tube and gas inlet tube, through which nitrogen is admitted, 2 liters of toluene and 150.5 g. (697 mmoles) of 6-aminopenicillanic acid are placed. 220 ml. (1579 mmoles) of triethylamine are added and over a period of about 20 min. 250 ml. (approximately 1980 mmoles) of trimethylchlorosilane are added dropwise. Stirring is continued at room temperature for 2.5 hours after completion of the addition. Another one liter of toluene is added and the temperature is brought to —60° C. Next, 90 ml. (646 mmoles) of triethylamine are added. Then, 112 ml. (about 1.8 mole) of liquid phosgene is added while the temperature of the reaction mixture is kept below —40° C. Stirring is continued for 3 hours at —40° C. At this temperature the precipitate formed is filtered off under nitrogen and washed with 500 ml. of toluene. From the combined filtrate and washing the greater part of the phosgene is removed by evaporation at —40° C. The temperature is then slowly brought to —20° C., under reduced pressure. The remaining traces of phosgene, together with trimethylchlorosilane and triethylamine are removed while the temperature is allowed to slowly rise to +25° C., simultaneously most of the toluene is removed. During the evaporation procedure pressure is maintained between 0.5 and 1.5 mm. Hg. The final volume of the solution is 750 ml. containing 263 mg./ml. of the trimethylsilyl ester of 6-isocyanatopenicillanic acid (yield: 80%).

25 ml. of this solution of the isocyanate in toluene is concentrated under reduced pressure and with exclusion of moisture, to a volume of about 10 ml. spontaneous crystallization occurs. 3 ml. of anhydrous toluene are added and the crystalline product is filtered with suction under nitrogen and washed twice with toluene. The crystals are freed from traces of toluene and stored in a nitrogen atmosphere. The yield is about 4 g. of trimethylsilyl ester of 6-isocyanatopenicillanic acid having a melting point 85°–88° C. $[\alpha]_D^{20°} = +163.3°$ in toluene. The molecular weight according to mass spectroscopy is 314.

Analysis.—(C, H and N) for $C_{12}H_{18}N_2O_4SSi$ Calcd. (percent): C, 45.86; H, 5.73; N, 8.92. Found (percent): C, 45.92; H, 5.78; N, 8.87.

EXAMPLE 2

6-(2-methyl-3-phenyl-2H-isoindole-1-carboxamido)penicillanic acid

To a stirred solution of 8.0 g. of 2-methyl-3-phenyl-2H-isoindole in 50 ml. of benzene under a nitrogen atmosphere is added a solution of 12.0 g. of 6-isocyanatopenicillanic acid, trimethylsilyl ester in 150 ml. of benzene. The reaction is stirred at 27° C. for 20 hr. and the solvent was evaporated in vacuo. To the residue is added 1300 ml. of anhydrous ether and the insoluble portion is filtered. The filtrate is decolorized with charcoal causing the ether solution to assume a green color. Partial evaporation of the solution (to 150 ml.) causes green solid to separate. After redilution with ether to a total volume of 300 ml. the mixture is filtered, and the filtrate in 450 ml. of ether is diluted with 450 ml. of pentane to precipitate 1.8 g. of the above titled product (solid shrinks at 134° C., M.P. 144° C. dec.). An addition 1.7 g. of product is obtained by further dilution of the filtrate with one liter of pentane.

The infrared spectrum (KBr) of the above product exhibits bands at 2.96μ (NH), 5.60 β-lactam, 5.75 (acid CO), 6.10 (amide CO), 6.67 (amide II and aromatic), and 14.2 (mono substituted phenyl).

The nuclear magnetic resonance spectrum ($d_6$-DMSO) of the product exhibits peaks at δ 1.58 (3, s), 1.71 (3, s), 2.87 (1, s), 4.08 (3, s), 5.74 (2, m), 7.0–8.0 (9, m), and 8.5 (1, d) in addition to minor impurity peaks.

A thin layer chromatogram on silica gel GF plates developed with butanone, water, and acetic acid in the ratio of 7:2:1 indicates the product has an $R_f$ of .89 and contains minor impurities at $R_{fs}$ .58 and .84.

EXAMPLE 3

Following the procedure of Example 2, 6-isocyanatopenicillanic acid, trimethylsilyl ester is reacted with 2-benzyl - 3 - phenyl-2H - isoindole to yield 6(2-benzyl-3-phenyl-2H-isoindole-1-carboxamido)penicillanic acid.

The compounds of Formula I of this invention have been found to possess antibacterial activity. Antibacterial screening is carried out by an agar serial dilution technique. Distilled water is used as a vehicle. The stock solution is prepared at 10,000 μg./ml. of substance in the vehicle. Two-fold dilutions are made with sterile water. One ml. quantities of each dilution are incorporated into 9 ml. seed agar in sterile petrie dishes. The hardened surface is inoculated with test organisms and incubated 18 hours at 35° C. The end point is reported as a minimal inhibitory concentration (MIC) express in μg./ml.; the least amount of test substance that will completely inhibit the test organism. The compound of Example 1 when tested against *Staphylococcus aureus* 6538P and *Staphylococcus aureus* Smith produced a MIC value in each case of 3.90 μg./ml.

The compounds of this invention may be used in cleaning or disinfecting compositions (e.g., dairy barns) at a concentration of about 0.1 to 1% by weight of such compositions dissolved or suspended in a suitable inert carrier for application by washing or spraying.

What is claimed is:
1. A member selected from the group consisting of the compounds having the formula

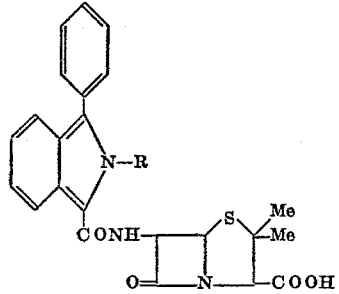

wherein R is selected from the class consisting of lower alkyl and aryl (lower) alkyl wherein said aryl is phenyl or naphthyl; and their non-toxic addition salts.

2. A compound of claim 1 which is: 6-(2-methyl-3-phenyl-2H-isoindole-1-carboxamido) penicillanic acid.

References Cited
UNITED STATES PATENTS

| | | | |
|---|---|---|---|
| 3,577,408 | 5/1971 | Alburn et al. | 260—239.1 |
| 3,647,783 | 5/1972 | Pirie | 260—239.1 |
| 3,652,547 | 3/1972 | Wolf et al. | 260—239.1 |

NICHOLAS S. RIZZO, Primary Examiner

U.S. Cl. X.R.

424—271